(No Model.) 2 Sheets—Sheet 1.
B. F. BERGH.
APPARATUS FOR PRODUCING DESIGNS IN CAKES OF SOAP.
No. 569,604. Patented Oct. 20, 1896.
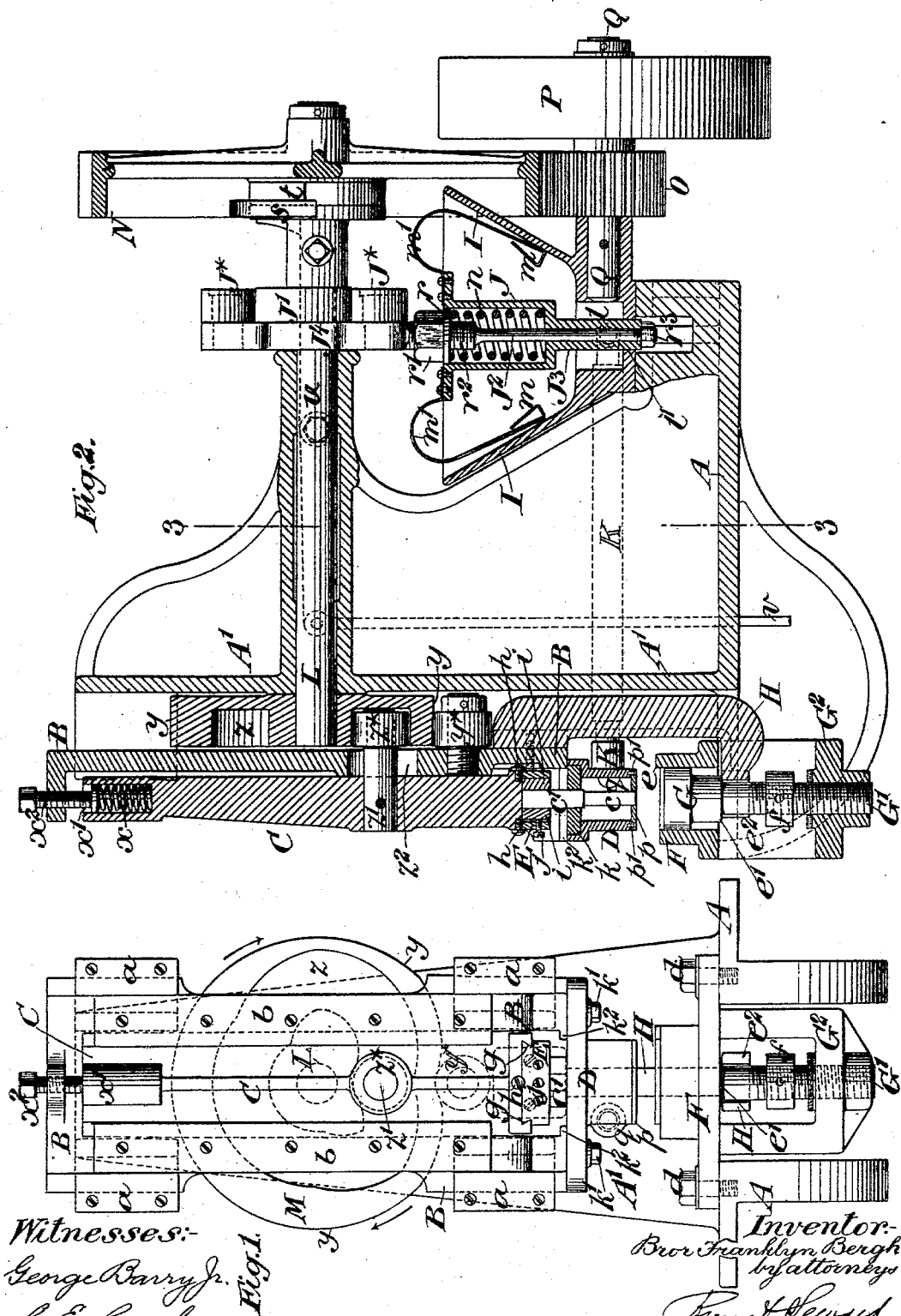
Witnesses:
George Barry Jr.
C. E. Combs.
Inventor:
Bror Franklyn Bergh
by attorneys
Brown & Seward (No Model.) 2 Sheets—Sheet 2.
B. F. BERGH.
APPARATUS FOR PRODUCING DESIGNS IN CAKES OF SOAP.
No. 569,604. Patented Oct. 20, 1896.
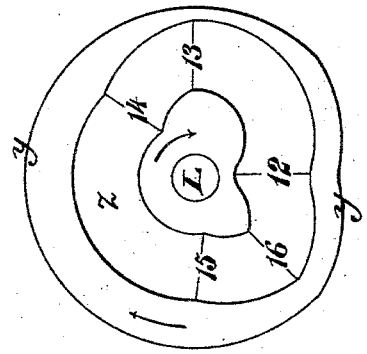
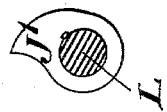
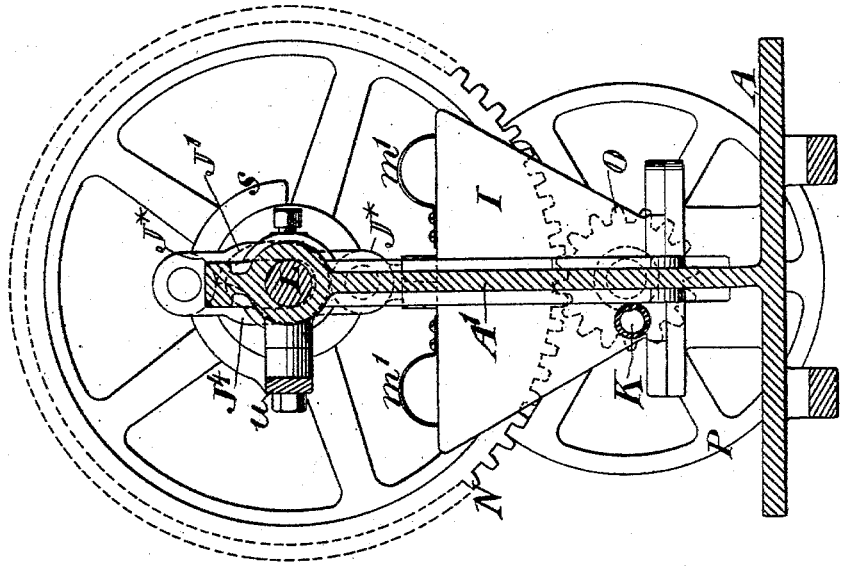
Witnesses:—
George Barry Jr.
C. E. Combs
Inventor:—
Bror Franklyn Bergh
by attorneys
Brown & Seward
THE NORRIS PETERS CO., PHOTO-LITHO., WASHINGTON, D. C.

UNITED STATES PATENT OFFICE.

BROR F. BERGH, OF NEW YORK, N. Y., ASSIGNOR, BY DIRECT AND MESNE ASSIGNMENTS, TO MICHAEL HOFFMAN WILSON, OF BROOKLYN, AND THE ARCHER MANUFACTURING COMPANY, OF ROCHESTER, NEW YORK.

APPARATUS FOR PRODUCING DESIGNS IN CAKES OF SOAP.

SPECIFICATION forming part of Letters Patent No. 569,604, dated October 20, 1896.

Application filed November 13, 1895. Serial No. 568,753. (No model.)

*To all whom it may concern:*

Be it known that I, BROR FRANKLIN BERGH, of the city and county of New York, in the State of New York, have invented a new and useful Improvement in Machinery for Producing Designs, Figures, and Inscriptions in Cakes of Soap, of which the following is a specification.

This invention has for its object the production, in a cake of soap, of designs, figures, or inscriptions which run through the whole or any desired portion of the thickness of the cake and which remain until the cake has been completely (or as nearly as may be desired) used up in washing, such designs, figures, or inscriptions being produced with or composed of a soap or substance which is of a different color or which differs in some way visibly from the soap of which the body of the cake is composed.

The invention consists in certain means hereinafter described and claimed whereby such figures and designs are produced.

Figure 1 is a front view of a machine embodying my invention. Fig. 2 is a central vertical sectional view taken at right angles to Fig. 1. Fig. 3 represents a vertical section taken in the line 3 3 of Fig. 2. Figs. 4 and 5 are front views of cams employed for operating different parts of the machine. Fig. 6 represents a top view of the cake of soap having an inscription produced in it by the machine. Fig. 7 represents a longitudinal vertical section corresponding with Fig. 6.

This machine comprises a receiver for the cake of soap, a punch or punches, and means of operating the same for punching in the said cake while in said receiver a cavity or cavities of a form corresponding with the design, figure, or inscription to be produced therein, a reciprocating feed-box for containing a portion of the different soap or substance, hereinafter termed the "coloring" substance, a die or stripper plate constituting the bottom of said box and in which plate there are openings corresponding in form with the punch or punches, and a forcing apparatus for forcing into said box and through said stripper-plate and injecting into the cavity or cavities produced in the cake by the punch or punches the said different soap or substance of which the design, figure, or inscription is to be composed.

A A' designate the framing of the machine, consisting of a table A and a standard A' thereon. This framing may be supported on legs or on any suitable base. On the front of the standard A' are provided upright ways $a$, within which there moves vertically a slide B. On the front of this slide B there are vertical ways $b$, within which moves vertically a slide C. The back slide B carries at its lower end the feed-box D for containing a portion of the different soap or other substance which is to be forced into the cavities in the cake of soap for the purpose of producing the design, figure, or inscription therein. The front slide C, which may be termed the "punch-carrier," carries at its lower end the punch holder or chase E, in which is or are secured the punch or punches $c$, hereinafter spoken of as the "punch," for producing in the cake of soap the cavity or cavities for the reception of the different soap or other substance. The bottom of the feed-box D is constituted by a die or stripper plate in which there is or are an opening or openings corresponding in form with the punch which fits and works freely through the said opening or openings of the die.

Under the slides B and C there is secured by bolts $d$ upon the table A a receiver F for the cake of soap. This cake may be produced by any of the known methods of manufacturing soap in cakes. The said receiver F consists of a box the sides of the interior of which conform to the sides or edges of the cake of soap to be treated, and the rear side of which is slightly raised, as shown at $e$ in Fig. 2, to serve as a gage for the proper introduction of the cakes. The said receiver is fitted with a freely-moving plunger G, which fits snugly within its side walls. The lower portion of the feed-box D, which also conforms to the sides of the cake of soap interior of the side walls of the receiver F, is so arranged that it may enter like a plunger into the receiver as far as may be necessary to perfectly close the mouth of the latter. The stem G' of the plunger G works through a guide in a hanger G², under the table A, and is constructed with a shoulder $e'$ and with an adjustable collar $f$. The said stem is embraced below between the shoulder $e'$ and collar $f$ by the forked lower end $e^2$ of a hanger H, which is rigidly bolted to the back of the slide B, there being space enough between the said shoulder $e'$ and collar $f$ for some free movement of the slide independently of the plunger G.

To produce the reciprocating movements of the slides B and C and the feed-box and punches, which will be hereinafter more fully described, two cams $y$ and $z$ are provided on a rotary shaft L, which works in a suitable bearing in a standard A', both of said cams being formed in or on the same cam-disk M of which the periphery constitutes the cam $y$ and a groove in its face constitutes the cam $z$, the cam $y$ operating upon a roller $y^*$, attached to the slide B, and the cam $z$ acting upon a roller $z^*$, attached to the slide C. The stud $z'$, which is secured in the slide C to carry the roller $z^*$, passes through a slot $z^2$, provided for it in the slide B, to permit the said slide C to move independently of the said slide B.

The punch-holder E is made capable of being removed from and replaced in the lower end of the slide C by being fitted thereto with dovetailed tongues and grooves, as shown at $g\ g$ in Fig. 1, and is retained therein by set-screws $h$. The punch may be secured therein in any suitable manner, but when the punch is composed of several letters or members the said letters or members will be fitted to the holder E with furniture $i$ (see Fig. 2) in the same manner in which printers' type are fitted to the chase and locked up therein by means of screws $j$, as shown in Figs. 1 and 2. This provides for making punches interchangeable for different designs or inscriptions. The die or stripper plate $p$, constituting the bottom of the feed-box D and having openings in it which correspond with the form of the punch, must of course also be removable and interchangeable. This plate $p$ constitutes a guide to the punch. It is represented in Fig. 1 as attached to the box by screws $p'$. The upper portion $c'$ or stock of the punch or of each punch member works freely but snugly through an opening in a guide-plate $k$, which constitutes the top of the feed-box D. The said portion $c'$ is made larger than the operative portion $c$, which must be of a length not less than the depth which it is to penetrate into the soap, the said operative portion conforming throughout its whole length to its face or lower extremity.

The guide-plate $k$ will in most cases, especially when the punch consists of several members, require to be changeable to conform to the punch members, and hence is removably fitted into a recess in the top of the box, as shown in Fig. 2. The said guide-plate is represented as secured in the feed-box by means of screws $k'$, which attach the feed-box to the bottom of the slide B, the top of the plate being flush with the top of the box and the plate being held down to the bottom of the said recess by projections $k^2$ at the sides of the opening which is provided in the lower part of the said slide B for the punch-holder to work in.

I is a receptacle represented as of hopper-like form for the soap or substance of different color or appearance to be injected into the cavities formed by the punch C in the cake of soap. In the bottom of this receptacle I there is a cylindrical cavity $l$, which constitutes the cylinder of a ram, to which is fitted a plunger J, and which is connected at $q$ by a pipe K with the feed-box D, a sufficient portion of the length of said pipe K being made flexible to make it accommodate itself to the upward and downward movement of the feed-box D with the slide C in the operation of the machine, which will be hereinafter explained.

The ram-plunger J is operated by a cam J' on the shaft L, the said cam acting between two rollers J* on a cam-yoke J⁴ on the head of the rod, J², which carries the said plunger J. The said plunger is prolonged at the bottom in the form of a stem J³, which is of smaller diameter than the operating portion of the said plunger and which works in a stationary guide $l'$ in the bottom of the cylinder $l$. The movement of the ram-plunger is such that in its upward stroke its operative portion is withdrawn from the cylinder $l$, as shown in Fig. 2, far enough to leave plenty of room below it for the soap or other substance in the hopper I to pass freely under it into the cylinder $l$. For the purpose of gathering the soap in the hopper I in toward the cylinder $l$ there are arranged on opposite sides of the ram-plunger J collectors $m$, which are attached to or form parts of springs or elastic arms $m'$, which are secured to the head of the plunger. These collectors are held by the elasticity of the springs or arms $m'$ against the sides of the hopper, and as the ram-plunger descends they collect the soap or other substance, which is in a semifluid condition, and feed it into the cylinder $l$, preparatory to the entrance of the ram-plunger thereinto. In order to prevent any excess of material from the hopper I from being forced into the cylinder $l$, and thereby endangering the bursting of the said cylinder or of the box D or of the pipe K, the plunger-rod J² is not rigidly attached to the plunger, but is connected therewith, so that a yielding pressure is given to it in its downward movement. This yielding pressure is provided for by making the ram-plunger hollow and placing within it a coil-spring $n$, the lower end of which rests upon a bearing within the said plunger and the upper end of which has bearing upon it a collar $r$, provided on the plunger-rod J². This collar $r$ is made adjustable to regulate the degree of yielding pressure on the ram-plunger by means of a nut $r'$, fitted to a screw-thread $r^2$ on the said plunger-rod. The plunger is secured on its rod by a nut $r^3$ at the bottom.

Rotary motion may be given to the cam-shaft L by any suitable means. For this purpose the said shaft is represented as furnished with a spur-gear N, which gears with a pinion $o$, which is firmly secured to a driving-pulley P and which with the said pulley turns on a fixed shaft Q, firmly secured to the framing of the machine in any suitable manner. The said shaft Q is represented as secured to the base of the hopper I. The gear N is represented as coupled with the shaft L by a tripping device $s\ t\ u$, such as is commonly used in punching-presses and which leaves the gear N disengaged from the shaft L until the tripping device is thrown into operation by the pressure of the foot of the operator upon a treadle connected with the said tripping device by a rod $v$, as shown in Fig. 2. As this tripping device forms no part of the invention no further description of it is necessary.

As introductory to the description of the operation of the machine I will briefly explain the forms of the cams $y$ and $z$ and their actions upon the slides B and C. First as to the cam $z$: Commencing at the point 12 nearest the center of the said cam which corresponds with the highest position of the slide C, as shown in Figs. 1 and 2, the said cam curves outward to the point 13 in such manner as to produce a downward movement of the said slide, thence curves inward to the point 14 in such manner as to produce an upward movement of the said slide, and thence to the point 15 it is concentric with the shaft L to hold the said slide stationary. From 15 to 16 it curves outward to again depress the slide, and from 16 it thence curves inward to the point 12 first mentioned. The cam $y$ conforms to the cam $z$ throughout the curve 16 12 and through a portion of the curve 12 13, and throughout the remainder of its circumference it is concentric with its shaft. Hence the said cam depresses its slide B through a portion of the first downward movement of the slide C, then holds the slide C stationary during the continued first depression of the slide C, and through the following movements of the slide C until the final ascent of the latter, when both ascend together. The cam-roller $y^*$ of the slide B is confined to the periphery of its cam $y$ by means of a coil-spring $x$, which is inserted in a box $x'$ in the upper end of the slide C and which presses against the lower end of a screw $x^2$, screwed through a lug on the upper end of the slide B. The yielding of the spring $x$, the pressure of which may be regulated by the screw $x^2$, permits the free movement of the slide C by the cam $z$, while the slide B remains stationary.

The cam $J'$ is represented as having only a single offset for the purpose of depressing and drawing back the ram-plunger J during the proper stages of the operation of the slides B and C.

Prior to the commencement of the operation of the machine its several parts occupy the positions represented in Figs. 1 and 2, the slides B and C being in their highest positions, the plunger G resting by its shoulder $e'$ on the fork of the bracket H, with its upper face nearly flush with the top of the receiver F, the bottom of the feed-box D being at a sufficient distance above the receiver, and the punch being drawn up flush, or nearly so, with the plate $p$. The ram-plunger J is also drawn up above the cylinder $l$. While the parts are in these positions the operator places a cake of soap in the receiver, and on rotary motion being communicated to the shaft L the slides B and C at first both move down, together with the punch and the feed-box D, and the cake is depressed by the latter into the receiver, the plunger G descending to make room for the cake. The slide B, with the feed-box D and plunger G, then stops, while the slide C, with the punch, continues its descent far enough for the punch to penetrate the cake the requisite depth to produce therein the cavity or cavities for the reception of the different soap or coloring substance, and while the said slide C rises high enough to withdraw the punch completely from the die or stripper plate $p$ into the feed-box and sufficiently above the openings in said plate for the free passage through said openings for the soap or coloring substance in the feed-box. Both slides, with the feed-box and punch, then remain stationary, while the ram-plunger J is depressed by the cam $J'$ and forces the different soap or substance from the feed-box through the openings in the plate $p$ into the cavities produced in the cake by the punches. The slide B and the box and plunger G continue stationary, the feed-box closing the mouth of the receiver F, while the slide C and the punch are again depressed far enough to take the punch back into the plate $p$ with its end flush with the lower face of said plate. As the punch thus enters the holes in the plate $p$ it expels therefrom any of the coloring substance that may have been left in said holes and forces it into the cake. After this the two slides, with the box, the plunger G, and the punch, rise together to their highest position, (shown in Figs. 1 and 2,) the plunger G raising the finished cake high enough above the receiver F to be removed by the hand of the operator. The machine is now in condition to receive a new cake and ready for a repetition of the operation.

It has been hereinbefore explained that the connection between the plunger G and the slide B, by means of the fork $e^2$ of the hanger H and the shoulder $e$ and collar $f$ on the stem of the said plunger, provides for some free movement of the slide B independently of the plunger. This is to provide room between the said plunger and the box for the introduction of the cakes and allows the plunger to come to a stop at the bottom of the receiver, while the box continues its descent a short distance to come close down on the top of the cake.

The term "cake of soap" as used throughout this specification is intended to include not only what is commonly called a "cake," but also a bar, block, slab, or piece of any form.

What I claim as my invention is—

1. The combination of a receiver for a cake of soap, a punch and a reciprocating carrier therefor for producing in said cake a cavity or cavities for the reception of a coloring substance, and a feed-box having openings in it corresponding with the punch for supplying the coloring substance to said cavity or cavities and located between the punch-carrier and the receiver, the punch passing through said openings in the feed-box and alternately opening and closing the same, substantially as herein described.

2. The combination of a receiver for a cake of soap, a punch for producing in said cake a cavity or cavities for the reception of a coloring substance, a reciprocating feed-box from which the coloring substance is supplied to said cavity or cavities and which leaves the receiver open for the reception of the cake but closes it to confine the cake therein during such supply, and guides in said feed-box for the punch, substantially as herein described.

3. The combination of a receiver for a cake of soap, a punch for producing in said cake a cavity or cavities for the reception of a coloring substance, and a reciprocating feed-box from which the coloring substance is supplied to said cavity or cavities and through which said punch passes and which enters said receiver as a plunger to confine the cake therein during the operation of the punches and during the supply of the coloring substance to the said cavity or cavities, substantially as herein described.

4. The combination of a receiver for a cake of soap, a punch for producing in said cake a cavity or cavities for the reception of a coloring substance, a reservoir for coloring-matter for filling said cavity or cavities, a reciprocating feed-box containing guides for the punches and serving to open and close the receiver, a ram for forcing the coloring substance from said reservoir through said feed-box into said cavity or cavities, and a flexible pipe between said ram and the reciprocating feed-box, substantially as herein described.

5. The combination of a slide and a stationary guide therefor, a second slide and guides therefor on the first-mentioned slide, a feed-box carried by one slide, a punch carried by the other slide and working through said feed-box and a ram for forcing semi-fluid material into and through said box, and a cam-shaft and cams thereon for giving said slides separate movements in their respective guides and for operating said ram, substantially as herein described.

6. The combination of the receiver, the reciprocating feed-box conforming externally to and entering said receiver for closing it, the plunger forming the bottom of said receiver and the slide by which the said feed-box and plunger are both carried, the said slide and feed-box being capable of a limited movement independently of said plunger, substantially as herein described.

7. The combination of the punch-carrying slide and the reciprocating feed-box-carrying slide the one movable within or upon the other, the cam-shaft and the two cams thereon for operating the two slides respectively, and the spring interposed between the two slides for permitting the movement of the punch-carrying slide while the feed-box-carrying slide remains stationary, substantially as herein described.

8. The combination of a receiver for a cake of soap, a punch for producing in said cake a cavity or cavities for the reception of a coloring substance, a stationary reservoir for a coloring substance to be supplied to said cavity or cavities, a reciprocating feed-box between said reservoir and said receiver, a flexible pipe between said reservoir and feed-box, and a ram and means of producing a yielding pressure thereon for forcing the coloring substance from said reservoir through said pipe to the feed-box, substantially as herein described.

9. The combination of a receiver for a cake of soap, a punch and a reciprocating carrier therefor for producing in said cake a cavity for the reception of a coloring substance, a feed-box having an opening in it corresponding with the punch for supplying the coloring substance to said cavity and located between the punch-carrier and the receiver, and a ram for forcing the coloring substance through said feed-box and through said opening, the punch passing through said opening and alternately opening and closing the same, substantially as herein described.

In testimony whereof I have hereunto subscribed my name in presence of two subscribing witnesses.

BROR F. BERGH.

Witnesses:
FREDK. HAYNES,
L. M. EGBERT.